JAMES HARRISON.
Improvement in Apparatus for Releasing Horses.

No. 120,272. Patented Oct. 24, 1871.

Witnesses:
A. W. Almqvist
Francis McArdle

Inventor:
James Harrison
Per [signature]
Attorneys.

120,272

UNITED STATES PATENT OFFICE.

JAMES HARRISON, OF NEW YORK, N. Y.

IMPROVEMENT IN APPARATUS FOR RELEASING HORSES.

Specification forming part of Letters Patent No. 120,272, dated October 24, 1871.

*To all whom it may concern:*

Be it known that I, JAMES HARRISON, of the city, county, and State of New York, have invented a new and useful Improvement in Apparatus for Disconnecting Horses from their Stalls; and I do hereby declare that the following is a full, clear, and exact description thereof, which will enable others skilled in the art to make and use the same, reference being had to the accompanying drawing forming part of this specification.

Figure 1:
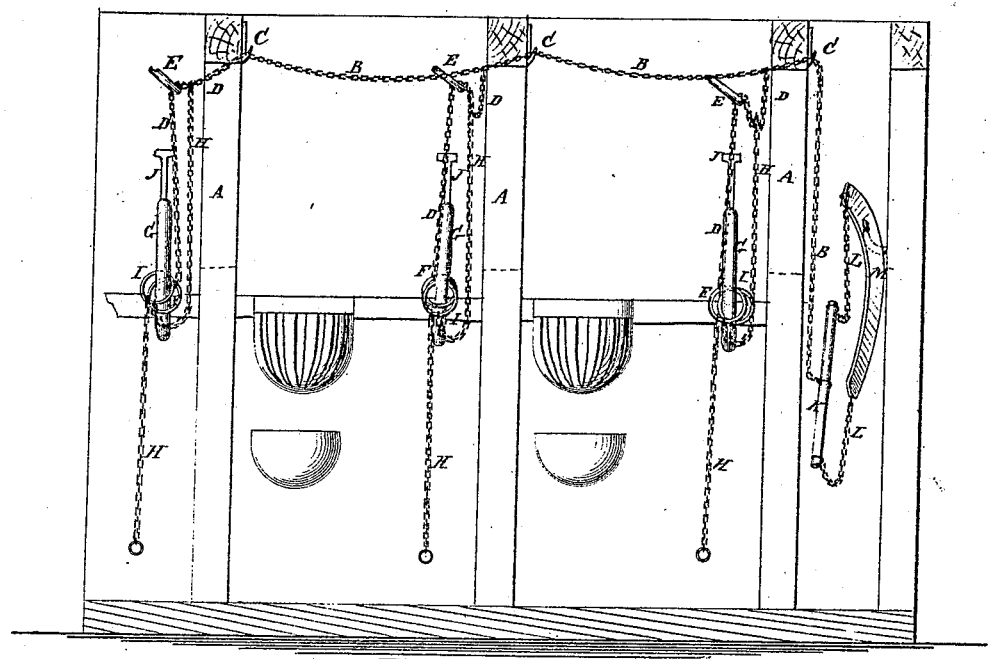
Figure 2:
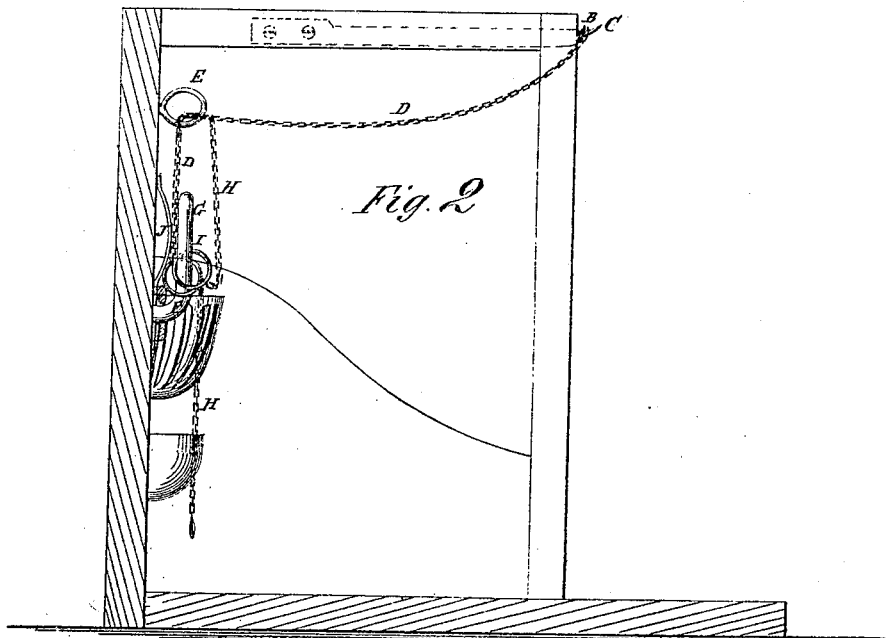

Figure 1 is a rear view of a series of stalls to which my improved apparatus has been applied. Fig. 2 is a detail sectional view of one of the stalls.

My invention has for its object to furnish an improved apparatus for application to the stalls of a stable, which will enable all the horses or other animals secured in said stalls to be disengaged and led or drawn from said stable, where, in case of fire or other accident, there may be no time to enter each stall and disengage and lead out the animals one at a time, or when the said animals may be so frightened that they will not leave their stalls; and it consists in the apparatus constructed and arranged as hereinafter more fully described.

A represents the frames or partitions between the stalls. B is a chain extending from the door of the stable, or from near the door, back along the upper parts of the outer ends of the stalls, where it is supported in place by nails or pins C attached to the frames of the stalls or to some other part of the frame of the stable. From the chain B branch-chains D lead into each stall along the upper part of the partitions A, or along the ceiling of the said stalls. The chains D are passed through the eye of eye-bolts E attached to the frame-work at the front of the stalls, and have a ring, F, attached to their ends, of such size as to pass freely through the eyes E, and which are placed upon a long hook, G, attached to the frame-work or to some other support at the forward end of the stalls. To the chains D, just before they pass through the eyes E, is attached the end of a chain, H, the other end of which is attached to the head-stall of the horses. To the chains H is attached a ring, I, in proper position to be dropped over the long hooks G, above the rings F. The long hooks G may, if desired, be provided with springs J to prevent the rings F I from being accidentally detached from the hooks G. With the outer end of the chain B is connected a whiffletree, K, traces L, and breast-collar M, as shown in Fig. 1.

With this device, in case it is necessary to remove the horses quickly from the stalls, the first horse is led out, or one already out is brought to the door, the breast-collar M placed upon him, and he is led away from the stable. As he walks away the first effect is to detach the chain B from the nails or pins C. The next effect is to draw upon the chains D, which draws the rings F from the long hooks G, the rings F pushing the rings I from said hooks. This leaves the chains free, so that as they are still drawn upon the horses must pass or be dragged out of the stalls and then out of the stable.

Having thus described my invention, I claim as new and desire to secure by Letters Patent—

1. The arrangement of the chains B D H and rings F I with the pins or nails C, eye-bolts E, long hooks G, and the stalls of a stable, substantially as herein shown and described, and for the purpose set forth.

2. The combination of the whiffletree K, traces L, and breast-collar M with the chains B D H, substantially as herein shown and described, and for the purpose set forth.

JAMES HARRISON.

Witnesses:
   JAMES T. GRAHAM,
   T. B. MOSHER. (144)